(12) United States Patent
Abe et al.

(10) Patent No.: US 11,497,231 B2
(45) Date of Patent: Nov. 15, 2022

(54) METHOD FOR PRODUCING NON-FRIED NOODLES

(71) Applicant: NISSIN FOODS HOLDINGS CO., LTD., Osaka (JP)

(72) Inventors: Hideaki Abe, Osaka (JP); Mitsuru Tanaka, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 43 days.

(21) Appl. No.: 16/328,613

(22) PCT Filed: Aug. 29, 2017

(86) PCT No.: PCT/JP2017/030838
§ 371 (c)(1),
(2) Date: Feb. 26, 2019

(87) PCT Pub. No.: WO2018/043448
PCT Pub. Date: Mar. 8, 2018

(65) Prior Publication Data
US 2020/0093160 A1 Mar. 26, 2020

(30) Foreign Application Priority Data
Aug. 31, 2016 (JP) .............................. JP2016-170387

(51) Int. Cl.
*A23L 7/113* (2016.01)
(52) U.S. Cl.
CPC ........... *A23L 7/113* (2016.08); *A23V 2002/00* (2013.01); *A23V 2250/16* (2013.01); *A23V 2300/10* (2013.01)
(58) Field of Classification Search
CPC . A23L 7/113; A23V 2002/00; A23V 2250/16; A23V 2300/10
See application file for complete search history.

(56) References Cited

U.S. PATENT DOCUMENTS

| | | | | |
|---|---|---|---|---|
| 4,098,906 | A | * | 7/1978 | Hisaki ...................... A23L 7/109 426/242 |
| 4,840,808 | A | * | 6/1989 | Lee .......................... A23L 19/09 426/270 |
| 4,963,387 | A | | 10/1990 | Nakagawa et al. |
| 6,497,910 | B2 | | 12/2002 | Takahashi et al. |
| 2009/0047396 | A1 | * | 2/2009 | Ikeda ...................... A23L 27/40 426/271 |
| 2010/0323070 | A1 | | 12/2010 | Seto et al. |
| 2011/0129582 | A1 | | 6/2011 | Miyazaki et al. |
| 2011/0229613 | A1 | * | 9/2011 | Takizawa ................. A23L 7/113 426/275 |
| 2012/0034368 | A1 | | 2/2012 | Okazaki et al. |
| 2013/0251875 | A1 | | 9/2013 | Minamitani et al. |
| 2016/0249652 | A1 | | 9/2016 | Tanaka et al. |
| 2017/0156363 | A1 | * | 6/2017 | Munafo ................... A23G 1/32 |

FOREIGN PATENT DOCUMENTS

| | | |
|---|---|---|
| CN | 1409991 | 4/2003 |
| CN | 1709142 | 12/2005 |
| CN | 101686717 | 3/2010 |
| CN | 101933570 | 1/2011 |
| CN | 103153091 | 6/2013 |
| CN | 103260432 | 8/2013 |
| CN | 103315226 | 9/2013 |
| CN | 105636454 | 6/2016 |
| EP | 0666035 | 8/1995 |
| JP | 64-027447 | 1/1989 |
| JP | 6-000064 | 1/1994 |
| JP | 6-113802 | 4/1994 |
| JP | 2000-175638 | 6/2000 |
| JP | 2002-027930 | 1/2002 |
| JP | 2004-242571 | 9/2004 |
| JP | 2008-054661 | 3/2008 |
| JP | 4644298 B | 3/2011 |

(Continued)

OTHER PUBLICATIONS

International Search Report (PCT/ISA/210) issued in International Application No. PCT/JP2017/030838, dated Nov. 28, 2017, 5 pages with translation.
Written Opinion of the International Searching Authority (PCT/ISA/237) issued in International Application No. PCT/JP2017/030838, dated Nov. 28, 2017, 5 pages.
Decision to Grant issued in Japanese Patent Application No. 2016-170387, dated Apr. 17, 2018, 7 pages with translation.
New Food Industry, 2015, vol. 57, No. 12, pp. 11-16, about Asami Kojima and new food additives "Postassium Lactate", cited in the English translation of the International Search Report.
Office Action issued for Chinese Patent Application No. 201780034658.6, dated Aug. 4, 2021, 10 pages including English translation.

(Continued)

*Primary Examiner* — Katherine D LeBlanc
(74) *Attorney, Agent, or Firm* — Hamre, Schumann, Mueller & Larson, P.C.

(57) ABSTRACT

The present invention provides a method for producing non-fried noodles having a reduced sodium content and excellent noodle making properties, texture, and flavor.

Fresh noodles having excellent noodle making properties, texture, and flavor can be produced by adding 1 to 3% by weight of potassium lactate relative to a main raw material powder such as wheat flour even without adding salt. Further, non-fried noodles having a reduced sodium content and excellent texture and flavor can be produced by steaming the fresh noodles and then drying the noodles by hot air. Moreover, after drying, the non-fried noodles dried by hot air to have a moisture of 7 to 14% by weight is further subjected to a heating process with high-temperature hot air, a gas mixture of high-temperature hot air and water vapor, or superheated steam at 120 to 200° C. until the moisture of the non-fried noodles is reduced to 3 to 6% by weight, which can consequently reduce a harsh taste derived from potassium lactate.

4 Claims, No Drawings

(56) References Cited

FOREIGN PATENT DOCUMENTS

| JP | 4761534 B | 8/2011 |
|----|-----------|--------|
| JP | 2012-060999 | 3/2012 |
| JP | 2015-057979 | 3/2015 |
| JP | 2015-084772 | 5/2015 |
| JP | 2015-213434 | 12/2015 |
| WO | 2011/013185 | 2/2011 |

OTHER PUBLICATIONS

Office Action issued for Brazilian Patent Application No. BR112019003966-0, dated Nov. 29, 2021 (Published Dec. 7, 2021), 7 pages including English translation.
International Search Report (PCT/ISA/210) issued in International Application No. PCT/JP2017/030839, dated Nov. 28, 2017, 5 pages with translation.
Written Opinion of the International Searching Authority (PCT/ISA/237) issued in International Application No. PCT/JP2017/030839, dated Nov. 28, 2017, 11 pages with translation.
Office Action issued in Japanese Patent Application No. 2016-170389, dated Apr. 24, 2018, 5 pages with translation.
Decision to Grant issued in Japanese Patent Application No. 2016-170389, dated Jun. 5, 2018, 7 pages with translation.
The extended European Search Report issued for European patent application No. 17846454.1, dated Mar. 17, 2020, 5 pages.
Office Action issued for Chinese Patent Application No. 201780034708.0, dated Jul. 30, 2021, 10 pages including English translation.
Office Action issued for Brazilian Patent Application No. BR112019003977-5 , dated Nov. 29, 2021, 8 pages including English translation.

* cited by examiner

METHOD FOR PRODUCING NON-FRIED NOODLES

TECHNICAL FIELD

The present invention relates to a method for producing non-fried noodles having a reduced sodium content.

BACKGROUND ART

In recent years, many products having a reduced sodium content which are so-called reduced salt products have been launched for preventing hypertension. According to "Dietary Reference Intakes for Japanese (2010)" published by the Ministry of Health, Labour and Welfare, a target value of a salt intake per day was less than 9 g for an adult male and less than 7.5 g for an adult female. However, according to "Dietary Reference Intakes for Japanese (2015)", the target value of a salt intake per day for an adult male and an adult female was reduced to less than 8 g and less than 7 g, respectively. For that reason, intention to reduce salt intake is expected to grow even more from now on.

A technique for reducing a salt content in noodles is disclosed, for example, in Patent Literatures 1 to 4.

Patent Literature 1 describes udon noodles containing wheat flour, a thickener composition, and water, in which the thickener composition contains xanthan gum, locust bean gum, and guar gum, a technique relating to udon noodles having sufficient elasticity produced by adding a smaller amount of salt than that of conventional udon noodles.

Patent Literature 2 describes a technique for noodle making by mixing arginine or arginine salt into wheat flour, as a technique for producing salt-free or low salt Chinese noodles.

Patent Literature 3 describes noodles containing either one of or both isomaltulose and reduced isomaltulose and a method for producing the same, as noodles having a reduced or no content of a sodium salt, especially salt and a sodium carbonate, and a method for producing such noodles.

Patent Literature 4 describes a method for producing noodles using magnesium chloride contained in bittern, as a technique for producing salt-free noodles produced without adding salt.

CITATION LIST

Patent Literature

Patent Literature 1: Japanese Patent Laid-Open No. 2015-84772
Patent Literature 2: Japanese Patent Laid-Open No. 2015-213434
Patent Literature 3: Japanese Patent Publication No. 4644298
Patent Literature 4: Japanese Patent Publication No. 4761534

SUMMARY OF INVENTION

Technical Problem

The present invention provides a method for producing non-fried noodles having a reduced sodium content and excellent noodle making properties, texture, and flavor.

Solution to Problem

The present inventors conducted a study on a technique for noodle making without adding salt for a purpose of reducing a salt content, and consequently found out that noodles can be made similarly to conventional noodles by adding potassium lactate and such noodles also have flavor and texture equivalent to those of the conventional noodles made by adding salt. The present invention was completed based on the above findings.

That is, the present invention is a method for producing non-fried noodles including the steps of kneading a main raw material powder, water, and 1 to 3% by weight of at least potassium lactate as a sub material relative to a total weight of the main raw material powder to prepare dough, preparing noodle strings from the prepared dough, steaming the prepared noodle strings to gelatinize the noodle strings, and drying the gelatinized noodle strings by hot air.

In the present invention, non-fried noodles dried by hot air to have a moisture of 7 to 14% by weight are further subjected to a heating process with high-temperature hot air, a gas mixture of high-temperature hot air and water vapor, or superheated steam at 120 to 200° C. until the moisture of the non-fried noodles is reduced to 3 to 6% by weight.

Advantageous Effects of Invention

The present invention can provide a method for producing non-fried noodles having a reduced sodium content and excellent noodle making properties, texture, and flavor.

DESCRIPTION OF EMBODIMENTS

Hereinafter, the present invention will be described in detail. However, the present invention is not limited to the following description.

1. Raw Material Formulation

Examples of a main raw material powder used for producing non-fried noodles according to the present invention include grain flour such as wheat flour (including durum wheat flour), buckwheat flour, barley flour and rice flour, and various starches such as potato starch, tapioca starch and cornstarch, and these may be used singly or in combination. As the starches, raw starch, gelatinized starch, and processed starches such as acetylated starch, etherified starch and cross-linked starch can also be used.

In the present invention, 1 to 3% by weight of potassium lactate is added as a sub material relative to a total weight of those main raw material powders described above. With potassium lactate being added, non-fried noodles having sufficient noodle making properties and satisfactory texture can be produced without adding salt. A method for adding potassium lactate is not limited to a particular method, and potassium lactate is preferably added in a form of kneading water in which potassium lactate is dissolved. When less than 1% by weight of potassium lactate is added, dough lacks extensibility and viscoelasticity if salt is not added, and thus it is difficult to obtain sufficient noodle making properties and elastic texture. On the other hand, adding more than 3% by weight of potassium lactate not only has an influence on the flavor of noodles but also enhances a water absorption property which makes noodles soft when cooked. A more preferable amount of potassium lactate added is 1.5 to 2.0% by weight relative to a total weight of a main raw material powder.

As other sub materials, salt, an alkaline agent, phosphates, various thickeners, a noodle quality modifier, an edible fat or oil, a pH adjuster, various coloring agents such as carotene pigments, a preservative, and the like, which are generally used for producing non-fried noodles, can be added in the present invention. These may be added together with the main raw material powder or may be added in a form of kneading water in which these materials are dissolved or suspended. When an alkaline agent such as carbonate or a phosphate is added, a sodium content thereof is small even if a sodium salt is added, and thus adding these sub materials has not much effect on a reduction of a salt content. However, it is preferable that potassium salt or the like be used and avoid using a sodium salt as far as possible.

2. Kneading Step

Noodle dough (dough) according to the present invention may be prepared in accordance with an ordinary method. That is, a noodle material powder and kneading water may be kneaded so that they are uniformly mixed with each other with a batch mixer, a flow jet mixer, a vacuum mixer, or the like to prepare crumbly dough.

3. Noodle Making Step

Next, noodle strings are prepared from the prepared dough. The noodle strings may be prepared in accordance with an ordinary method in which the dough is extruded with an extruder or the like to prepare the noodle strings, or the dough is rolled into a crude noodle belt, which is compounded or the like to produce a noodle belt, the noodle belt is further rolled out a plurality of times to produce a noodle belt having a predetermined thickness, and then the noodle belt is cut with a cutting-out roll called a cutting blade to prepare the noodle strings. When the noodle strings are prepared after preparing the noodle belt, rolling-out and cutting-out may be performed after preparing the noodle belt with an extruder, or rolling-out and cutting-out may be performed after preparing the noodle belt having a multi-layer structure composed of a plurality of noodle belts. A preparation of an extruded noodle belt or extruded noodle strings with an extruder or the like is preferably performed under reduced pressure.

4. Steaming Step

Raw noodle strings prepared in the noodle making step are steamed in accordance with an ordinary method to gelatinize the noodle strings. A preferable steaming condition varies depending on types of noodles and thicknesses of noodles, and thus the condition may be appropriately set at a preferable condition to achieve target texture. Examples of the steaming method include not only heating with boiling or saturated water vapor but also heating with superheated steam, and a moisture supplying step such as showering and dipping can be combined with the steaming method. The cooked noodles can be dipped into a seasoning liquid, or a loosening agent can be added to the cooked noodles, as necessary.

5. Drying Step

The noodle strings are cut into single meal amount, which is weighed and filled into a container for drying, which is called a retainer, for drying. The drying is generally performed at a drying temperature of 60 to 100° C. The drying step may be performed by combining multiple conditions, and the noodle strings may be dried so that a moisture of the noodle strings after drying is reduced to 14.5% by weight or less.

Preferably, the non-fried noodles after drying is further subjected to a heating process at this time. As a heating condition for non-fried noodles dried to have a moisture 7 to 14% by weight, drying by heating is preferably performed on a mass of the dried noodles with high-temperature hot air, a gas mixture of high-temperature hot air and water vapor, or superheated steam at 120 to 200° C. until the moisture of the dried noodles is reduced to 3 to 6% by weight. Performing the heating process on the noodles after drying almost removes a harsh taste uniquely contained in potassium lactate.

As described above, a main raw material powder, water, and 1 to 3% by weight of at least potassium lactate as a sub material relative to a total weight of the main raw material powder are kneaded to prepare dough, noodle strings are prepared from the prepared dough, and the noodle strings are steamed and then dried by hot air to produce non-fried noodles. Accordingly, the method for producing non-fried noodles having a reduced sodium content and excellent noodle making properties, texture, and flavor can be provided.

EXAMPLES

Hereinafter, the present embodiment is described in more detail with reference to Examples below.

<Experiment 1> Amount of Potassium Lactate Added

Example 1-1

To a powder mixture in which a main raw material powder containing 950 g of wheat flour and 50 g of tapioca acetylated starch was mixed with 5 g of calcium carbonate as a sub material, kneading water obtained by dissolving 19.2 g of a 78% aqueous potassium lactate solution (containing 15 g of potassium lactate), 3 g of trisodium phosphate, 1 g of sodium pyrophosphate, and 0.4 g of a preparation of tocopherol in 350 g of water was added, and the resultant was mixed for 15 minutes with a normal pressure mixer to prepare noodle dough (dough).

The prepared dough was rolled into a crude noodle belt, which was compounded to prepare a noodle belt. The prepared noodle belt was rolled out with a roll so that the noodle belt eventually had a thickness of 0.9 mm, and the resultant noodle belt was then cut with a cutting blade roll having a #26 round blade to prepare noodle strings.

Next, the noodle strings were steamed for 2 minutes and 30 seconds in a steam chamber into which saturated water vapor was supplied at 270 kg/h to gelatinize the noodle strings.

The gelatinized noodle strings were dipped into a loosening liquid obtained by dissolving 12 g of dietary fiber of soybeans, 4 g of monosodium glutamate, and 1 g of an emulsified fat or oil in water and diluting the resultant up to 1 L, cut into about 30 cm, then filled into a retainer by 120 g per single meal, and dried at 70° C. for 50 minutes to produce sample non-fried noodles having a moisture of 7% by weight. A noodle weight at this time was 50 g.

Example 1-2

Sample non-fried noodles were prepared in accordance with Example 1-1 except that the aqueous potassium lactate solution was added in an amount of 12.8 g (10 g as potassium lactate).

Example 1-3

Sample non-fried noodles were prepared in accordance with Example 1-1 except that the aqueous potassium lactate solution was added in an amount of 25.6 g (20 g as potassium lactate).

Example 1-4

Sample non-fried noodles were prepared in accordance with Example 1-1 except that the aqueous potassium lactate solution was added in an amount of 38.4 g (30 g as potassium lactate).

Comparative Example 1-1

Sample non-fried noodles were produced in accordance with Example 1-1 except that the noodle dough (dough) was prepared in the following manner: to a powder mixture in which a main raw material powder containing 950 g of wheat flour and 50 g of tapioca acetylated starch was mixed with 5 g of calcium carbonate as a sub material, kneading water obtained by dissolving 15 g of salt, 3 g of trisodium phosphate, 1 g of sodium pyrophosphate, and 0.4 g of a preparation of tocopherol in 350 g of water was added, and the resultant was mixed for 15 minutes with a normal pressure mixer.

Comparative Example 1-2

Sample non-fried noodles were prepared in accordance with Example 1-1 except that the aqueous potassium lactate solution was added in an amount of 6.4 g (5 g as potassium lactate).

Comparative Example 1-3

Sample non-fried noodles were prepared in accordance with Example 1-1 except that the aqueous potassium lactate solution was added in an amount of 44.8 g (35 g as potassium lactate).

Noodle making properties of noodles and texture and flavor of cooked noodles in each experimental section were evaluated using Comparative Example 1-1 as a standard. As for the noodle making properties of noodles, noodles having excellent noodle making properties equivalent to that of Comparative Example 1-1 were evaluated as "Excellent", noodles having good noodle making properties on the whole were evaluated as "Good", noodles that have poor noodle making properties but were able to be made by machinery were evaluated as "Average", and noodles that lack noodle making properties and were unable to be made by machinery were evaluated as "Poor".

As for a cooking method, sample noodles and powdered soup were put in a cup-type foamed paper cup container, and 380 ml of boiling water was poured therein to cook the noodles for 3 minutes with a lid on, which was then eaten to evaluate the texture and flavor. The evaluation was made by 5 experienced panelists. As for the texture, noodles having suitable elasticity and excellent texture equivalent to those of Comparative Example 1-1 were evaluated as Excellent, noodles being slightly hard or soft but having good texture on the whole were evaluated as Good, noodles being relatively hard or soft and having poor texture were evaluated as Average, and noodles being too hard or soft and having significantly poor texture were evaluated as Poor. As for the flavor, noodles having excellent flavor equivalent to that of Comparative Example 1-1 were evaluated as Excellent, noodles having good flavor on the whole were evaluated as Good, noodles having a harsh taste and poor flavor were evaluated as Average, and noodles having a strong harsh taste and significantly poor flavor were evaluated as Poor.

The noodle making properties and sensory evaluation results for each experimental section of Experiment 1 are shown in Table 1 below.

TABLE 1

| Experimental section | Potassium lactate | Noodle making properties | Texture | Flavor | Comments |
| --- | --- | --- | --- | --- | --- |
| Example 1-1 | 1.5% by weight | Excellent | Excellent | Excellent/ Good | Noodle making properties and texture were equivalent to those of Comparative Example 1-1. A slightly harsh taste was sensed but the flavor was good on the whole. |
| Example 1-2 | 1.0% by weight | Good | Good | Excellent | Dough had slightly poor extensibility as compared to that of Comparative Example 1-1, but noodle making properties were good on the whole. Texture was slightly hard as compared to that of Comparative Example 1-1, but it was good on the whole. |
| Example 1-3 | 2.0% by weight | Excellent | Excellent | Excellent/ Good | Noodle making properties and texture were equivalent to those of Comparative Example 1-1. A slightly harsh taste was sensed but the flavor was good on the whole. |
| Example 1-4 | 3.0% by weight | Good | Good | Good | Slight stickiness was shown as noodle making properties, but noodle making properties were good on the whole. Texture was slightly soft and a slightly harsh taste was sensed, but the texture and the flavor were good on the whole. |
| Comparative Example 1-1 | 0.0% by weight | Excellent | Excellent | Excellent | Standard |
| Comparative Example 1-2 | 0.5% by weight | Average | Average | Excellent | Noodles were able to be made, but dough had poor extensibility and was dry and rough on the surface. Texture was hard and rough on the surface. |

TABLE 1-continued

| Experimental section | Potassium lactate | Noodle making properties | Texture | Flavor | Comments |
|---|---|---|---|---|---|
| Comparative Example 1-3 | 3.5% by weight | Average | Average | Average | Stickiness was shown as noodle making properties, and the noodles were in a borderline level of whether it is possible to make noodles or not. Texture was soft and a harsh taste was sensed as a flavor. |

<Experiment 2> Regarding Heating After Drying

Example 2-1

Non-fried noodles were produced by subjecting the non-fried noodles that had been dried in Example 1-1 to a heating process at 140° C. and at a wind velocity of 50 m/s until the moisture of the non-fried noodles was reduced to 4% by weight.

Example 2-2

Sample non-fried instant noodles were prepared by subjecting the non-fried noodles that had been dried in Example 1-1 to a heating process with a gas mixture of high-temperature hot air and saturated water vapor at 140° C. and at a wind velocity of 50 m/s (absolute humidity of 200 g/m$^3$) until the moisture of the non-fried noodles was reduced to 4% by weight.

Example 2-3

Sample non-fried instant noodles were prepared by subjecting the non-fried noodles that had been dried in Example 1-1 to a heating process with superheated steam at 140° C. and at 80 kg/h until the moisture of the non-fried noodles was reduced to 4% by weight.

Sensory evaluation results for the flavor of each experimental section in Experiment 2 are shown in Table 2. As for an evaluation method, Example 1-1 was used as a standard, and noodles having a less harsh taste than that of Example 1-1 was evaluated as Good, noodles having a harsh taste equivalent to that of Example 1-1 was evaluated as Average, and noodles having a stronger harsh taste than that of Example 1-1 was evaluated as Poor.

TABLE 2

| Experimental section | Flavor | Comments |
|---|---|---|
| Example 2-1 | Good | Almost no harsh taste was sensed. |
| Example 2-2 | Good | Almost no harsh taste was sensed. |
| Example 2-3 | Good | No harsh taste was sensed. |

The invention claimed is:

1. A method for producing non-fried noodles, comprising:
   kneading a main raw material powder, water, and a sub material so as to prepare dough;
   preparing noodle strings from the prepared dough;
   steaming the prepared noodle strings so as to gelatinize the noodle strings; and
   drying the gelatinized noodle strings by hot air,
   wherein the dough consists of: the main raw material powder; water; and the sub material,
   the sub material consists of: potassium lactate; and at least one material selected from the group consisting of, an alkaline agent, phosphates, thickeners, a noodle quality modifier, an edible fat or oil, a pH adjuster, coloring agents, and a preservative, wherein the sub material does not include common salt,
   an amount of potassium lactate in the dough is in a range from 1 to 3% by weight relative to a total weight of the main raw material powder, and
   in the drying of the gelatinized noodle strings by hot air, the gelatinized noodle strings are subjected to (i) a first drying to have a moisture in a range from 7 to 14% by weight, and then (ii) a second drying by heating with high-temperature hot air, a gas mixture of high-temperature hot air and water vapor, or superheated steam, at a temperature in a range from 120 to 200° C. until the moisture of the resulting non-fried noodles is reduced to be in a range from 3 to 6% by weight.

2. The method for producing non-fried noodles according to claim 1,
   wherein the amount of potassium lactate in the dough is in a range from 1.5 to 3.0% by weight relative to the total weight of the main raw material powder.

3. The method for producing non-fried noodles according to claim 1, wherein the amount of potassium lactate in the dough is in a range from 1.5 to 2.0% by weight relative to the total weight of the main raw material powder.

4. The method for producing non-fried noodles according to claim 1, wherein the first drying is performed at a temperature in a range from 60 to 100° C.

* * * * *